United States Patent
Schnee et al.

(10) Patent No.: US 12,260,246 B2
(45) Date of Patent: *Mar. 25, 2025

(54) EXTERNAL COMMUNICATION WITH PACKAGED VIRTUAL MACHINE APPLICATIONS WITHOUT NETWORKING

(71) Applicant: VMware LLC, Palo Alto, CA (US)

(72) Inventors: Joshua Schnee, Austin, TX (US); Douglas Jr. Baer, Mesa, AZ (US); Joseph Dieckhans, Fremont, CA (US); Pablo Roesch, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,588

(22) Filed: Sep. 20, 2023

(65) Prior Publication Data

US 2024/0004692 A1 Jan. 4, 2024

Related U.S. Application Data

(62) Division of application No. 15/876,913, filed on Jan. 22, 2018, now Pat. No. 11,797,326.

(51) Int. Cl.
*G06F 9/455* (2018.01)
*G06F 9/54* (2006.01)
*H04L 61/50* (2022.01)

(52) U.S. Cl.
CPC .......... *G06F 9/45558* (2013.01); *G06F 9/547* (2013.01); *H04L 61/50* (2022.05); *G06F 2009/45562* (2013.01); *G06F 2009/45595* (2013.01)

(58) Field of Classification Search
CPC ................. G06F 9/45558; G06F 9/547; G06F 2009/45562; G06F 2009/45595; G06F 9/5077; H04L 61/50; H04L 61/5007
See application file for complete search history.

(56) References Cited

U.S. PATENT DOCUMENTS

| | | | |
|---|---|---|---|
| 2015/0089504 A1* | 3/2015 | Hartman | G06F 9/4881 718/1 |
| 2019/0190885 A1* | 6/2019 | Krug | H04L 61/2517 |
| 2020/0076685 A1* | 3/2020 | Vaidya | G06F 9/44526 |
| 2020/0092138 A1* | 3/2020 | Tillotson | H04L 12/4633 |

\* cited by examiner

*Primary Examiner* — Farzana B Huq
(74) *Attorney, Agent, or Firm* — King Intellectual Asset Management

(57) ABSTRACT

One or more embodiments provide techniques that permit virtual computing instances in isolated environments to communicate information outside the isolated environments without requiring networking. In one embodiment, an encoder which runs in a virtual machine (VM) within an isolated environment, such as one of the VMs of a packaged virtual machine application that does not have external network connectivity, is configured to encode information, such as state information of the packaged virtual machine application, in portion(s) of a network address. The encoder further configures an unconnected network interface of the same VM, or another VM in the isolated environment, with the network address that includes the encoded information. A decoder, which could not otherwise communicate with the virtual computing instance via any network, may then retrieve the network address assigned to the unconnected network interface and decode that network address to obtain the information encoded therein.

20 Claims, 4 Drawing Sheets

EXTERNAL COMMUNICATION WITH PACKAGED VIRTUAL MACHINE APPLICATIONS WITHOUT NETWORKING

RELATED APPLICATIONS

This application is a divisional application of U.S. application Ser. No. 15/876,913, filed Jan. 22, 2018, the entire contents of which are incorporated herein by reference.

BACKGROUND

Computer virtualization is a technique that may involve encapsulating a computing machine platform into a virtual machine (VM) that is executed under the control of virtualization software running on a hardware computing platform (also referred to herein as "host server" or "host"). A group of hardware computing platforms may be organized as a cluster to provide resources for VMs. In a data center, it is common to see hundreds, even thousands, of VMs running on multiple clusters of host servers.

VMs may be deployed in various ways, including as packaged virtual machine applications that are logical containers of pre-configured VMs having software components and parameters that define operational details of the packaged applications. One example of such packaged applications is vApp technology made available by VMware, Inc. of Palo Alto, California.

For security and other reasons (e.g., cost), VMs such as those in some packaged virtual machine applications may be connected only to isolated networks without external network access. For example, VMs in a packaged application may be connected to an isolated internal network and/or to an isolated organization network allowing communications only between the VMs within that application and/or a virtual data center. Traditionally, such VMs without external network access could not communicate their statuses to external entities, making it difficult to externally monitor the VMs. For example, a packaged virtual machine application may fail but be unable to communicate its failed state externally. As a result, resources (e.g., CPU, memory, power, cooling, etc.) may be wasted on the failed packaged application, until that failure is manually detected and the packaged application is manually deleted.

SUMMARY

One embodiment provides a method for a virtual computing instance in an isolated environment to communicate information outside the isolated environment. The method generally includes encoding the information in one or more portions of a network address value. The method further includes configuring an unconnected network interface, of the virtual computing instance or of another virtual computing instance in the isolated environment, with the network address value that includes the information encoded therein.

Another embodiment provides a method for communicating with a virtual computing instance in an isolated environment from outside the isolated environment. The method generally includes retrieving a network address value of an unconnected network interface. The network address value includes information encoded by the virtual computing instance in the isolated environment, and the unconnected network interface is a network interface of the virtual computing instance or another virtual computing instance in the isolated environment. The method further includes decoding the encoded information in the retrieved network address value.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein permit virtual computing instances in isolated environments to communicate information outside the isolated environments without requiring networking. Although virtual machines (VMs) are used herein as a reference example of virtual computing instances, it should be understood that, in alternative embodiments, other types of virtual computing instances such as containers may be used in lieu of VMs. In one embodiment, an encoder which runs in a VM within an isolated environment, such as one of the VMs of a packaged virtual machine application (also referred to herein as a "packaged application") that does not have external network connectivity, is configured to encode information, such as state information of the packaged application, in portion(s) of a network address, such as an IP address. The encoder further configures an unconnected network interface of the same VM, or another VM in the isolated environment, with the network address that includes the encoded information. As used herein, an "unconnected" network interface is a virtual network interface that is not connected to any network, which is akin to a physical network adapter without a network cable plugged into it. A decoder, which could not otherwise communicate with the virtual computing instance via any network, may then retrieve the network address assigned to the unconnected network interface and decode that network address to obtain the information encoded therein. In one embodiment, the information that the encoder encodes in the network address may include information indicating a state of a packaged application, and the decoder may automatically take remediation actions (e.g., sending an e-mail alert to a user or deleting and reprovisioning the packaged application) based on a decoding of such state information. Although packaged virtual machine applications are used herein as a reference example, it should be understood that techniques disclosed herein may be used generally by any VM in an isolated environment to communicate with entities outside the isolated environment. For example, a VM may include two network interfaces, one of which is an unconnected network interface and the other of which is connected to an isolated network (or to no network), and the unconnected network interface may be assigned an IP address encoding information that is then retrieved and decoded by an external application that would otherwise be unable to communicate with the VM via any network.

Figure 1:
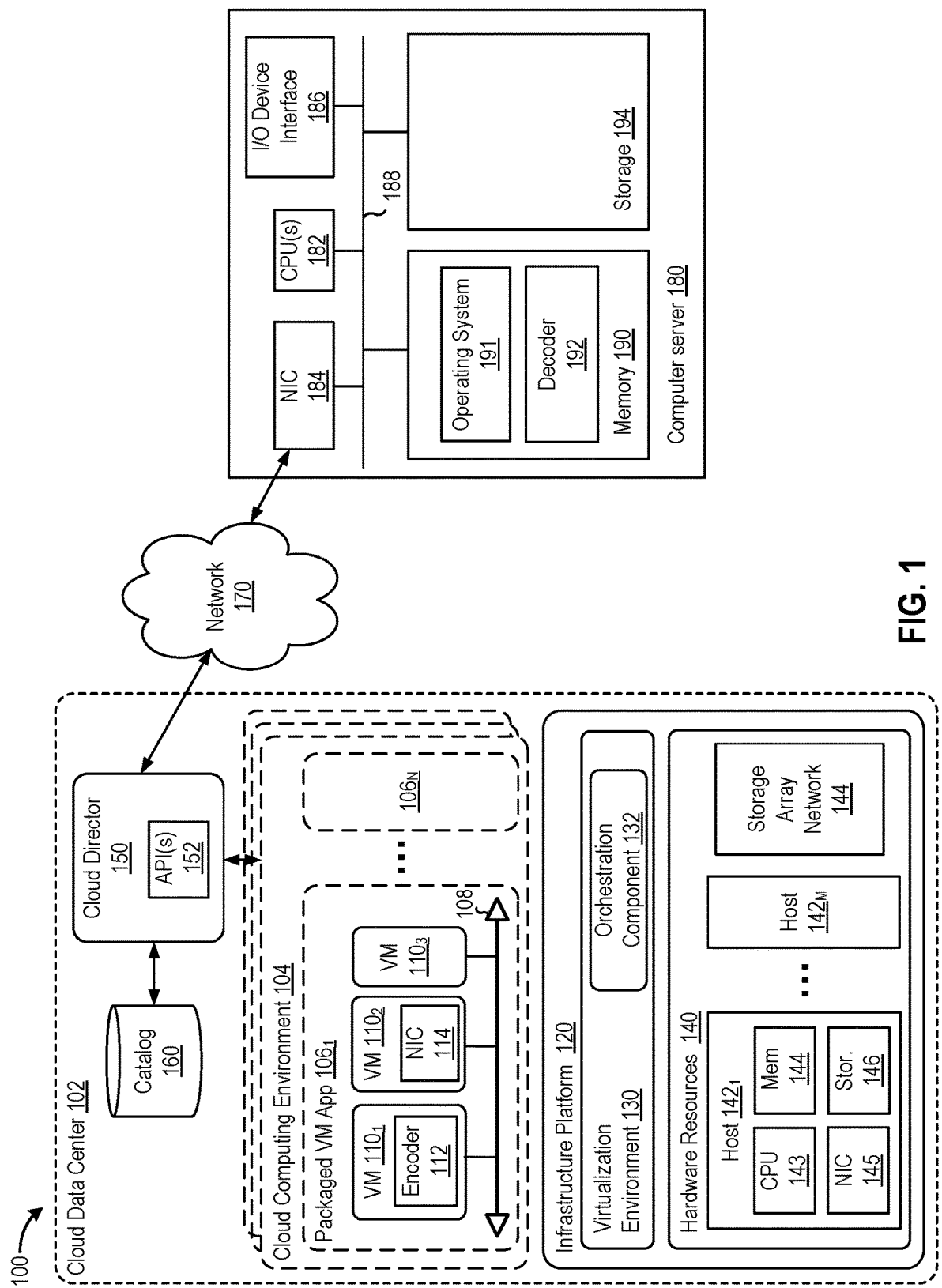
FIG. 1 is a block diagram of a computing system in which one or more embodiments of the present disclosure may be utilized.

FIG. 1 is a block diagram of a computing system 100 in which one or more embodiments of the present disclosure may be utilized. As shown, system 100 includes a virtualized computing system implementing a cloud data center 102 and a server 180 in communication with the virtualized computing system via a network 170. Cloud data center 102 may be, e.g., a "private" cloud controlled and administrated by a particular enterprise or business organization or a "public" cloud operated by a cloud computing service provider and exposed as a service available to account holders, such as the particular enterprise in addition to other enterprises. Although one cloud data center is shown for illustrative purposes, it should be understood that multiple such data centers may be utilized in other embodiments. Further, hybrid clouds that comprise both public and private clouds may also be used.

In one or more embodiments, cloud data center 102 is configured to dynamically provide an enterprise (or users of an enterprise) with one or more virtual data centers 104 in which a user may provision VMs 110, deploy multi-tier applications on VMs 110, and/or execute workloads. As shown, cloud data center 102 includes an infrastructure platform 120 upon which cloud computing environments 104 may be executed. In the particular embodiment of FIG. 1, infrastructure platform 120 includes hardware resources 140 having computing resources (e.g., hosts 1421 to 142N), storage resources (e.g., one or more storage array systems (SANs), such as SAN 144), and networking resources, which are configured in a manner to provide a virtualization environment 130 that supports the execution of a plurality of VMs 110 across hosts 142. It should be understood that hardware resources 140 of cloud data center 102 may in some embodiments be distributed across multiple data centers in different locations.

Hosts 142 may each be constructed on a server grade hardware platform, such as an x86 architecture platform. As shown, hardware platform 140 of each host 142 may include components of a computing device, such as one or more processors (CPUs) 143, system memory 143, a network interface 145, storage system 146, and other I/O devices such as, for example, a mouse and keyboard (not shown). CPU 143 is configured to execute instructions, for example, executable instructions that perform one or more operations described herein and may be stored in memory 144 and in local storage. Although shown as being a CPU 143, it should be understood that hardware platform 140 may generally include general purpose processor(s) and optional special purpose processor(s) for processing video data, audio data, or other types of data. For example, the processor(s) may include a single CPU, multiple CPUs, a single CPU having multiple processing cores, one or more graphical processing units (GPUS), one or more FPGA (field-programmable gate array) cards, or a combination of these. Memory 144 is a device allowing information, such as executable instructions, virtual disks, configurations, and other data, to be stored and retrieved. Memory 144 may include, for example, one or more random access memory (RAM) modules.

Network interface 145 enables host 142 to communicate with another device via a communication medium, such as a network within cloud data center 102. Network interface 145 may be one or more network adapters, also referred to as Network Interface Cards (NICs). Storage 144 represents local storage devices (e.g., one or more hard disks, flash memory modules, solid state disks, or optical disks) and/or a storage interface that enables host 142 to communicate with one or more network data storage systems. Examples of a storage interface are a host bus adapter (HBA) that couples host 142 to one or more storage arrays, such as a storage area network (SAN) or a network-attached storage (NAS), as well as other network data storage systems.

Each host 142 is configured to provide a virtualization layer that abstracts processor, memory, storage, and networking resources of hardware platform 140 into multiple virtual machines (e.g., one or more of VMs 110) that run concurrently on the same hosts. VMs run on top of a software interface layer, also referred to herein as a hypervisor, that enables sharing of the hardware resources of host 142 by the VMs. One example of a hypervisor that may be used in an embodiment described herein is a VMware ESXi™ hypervisor provided as part of the VMware vSphere® solution made commercially available from VMware, Inc. of Palo Alto, California. The hypervisor may run on top of the operating system of host 142 or directly on hardware components of host 142.

Each cloud computing environment 104 may be associated with a particular tenant of cloud data center 102. In one embodiment, cloud computing environment 104 may be configured as a dedicated cloud service for a single tenant comprised of dedicated hardware resources 140 (i.e., physically isolated from hardware resources used by other users of cloud data center 102). In other embodiments, cloud computing environment 104 may be configured as part of a multi-tenant cloud service with logically isolated virtualized computing resources on a shared physical infrastructure. As shown in FIG. 1, cloud data center 102 may support multiple cloud computing environments 104, available to multiple enterprises in single-tenant and multi-tenant configurations.

As shown, virtualization environment 130 includes an orchestration component 132 (e.g., implemented as a process running in a VM) that provides infrastructure resources to cloud computing environment 104 responsive to provisioning requests. For example, if an enterprise required a specified number of virtual machines to deploy a web application or to modify (e.g., scale) a currently running web application to support peak demands, orchestration component 132 can initiate and manage the instantiation of virtual machines (e.g., VMs 110) on hosts 142 to support such requests. In one embodiment, orchestration component 132 instantiates virtual machines according to a requested template that defines one or more virtual machines having specified virtual computing resources (e.g., compute, networking, storage resources). Further, orchestration component 132 monitors the infrastructure resource consumption levels and requirements of cloud computing environment 104 and provides additional infrastructure resources to cloud computing environment 104 as needed or desired. In one example, virtualization environment 130 may be implemented by running on hosts 142 VMware ESXi™ based hypervisor technologies provided by VMware, Inc. (although it should be recognized that any other virtualization technologies, including Xen® and Microsoft Hyper-V® virtualization technologies may be utilized consistent with the teachings herein).

Illustratively, cloud data center 102 further includes a cloud director 150 (e.g., running in one or more VMs) that manages allocation of virtual computing resources to an enterprise for deploying applications. Cloud director 150 may be accessible via API (Application Programming Interface) calls, such as REST (Representational State Transfer) API calls, or any other client-server communication protocol. As shown, cloud director 150 exposes API(s) 152 for, among other things, issuing commands with such API calls. Cloud director 150 may authenticate connection attempts from the enterprise using credentials issued by the cloud computing provider. Cloud director 150 maintains and publishes a catalog 160 of available VM templates and packaged virtual machine applications that represent VMs that may be provisioned in cloud computing environments 104. A VM template is a VM image that is loaded with a pre-installed guest operating system, applications, and data, and is typically used to repeatedly create VMs having the pre-defined configuration. As described, a packaged virtual machine application, such as a vApp, is a logical container of pre-configured virtual machines having software components and parameters that define operational details of the packaged application. Cloud director 150 receives provisioning requests (e.g., via API calls) and propagates such requests to orchestration component 132 to instantiate the appropriate virtual machines (e.g., VMs 110). One example of cloud director 150 is the vCloud Director® produced by VMware, Inc.

In the embodiment of FIG. 1, cloud computing environment 104 supports the creation of a virtual data center having a plurality of virtual machines 110 instantiated to, for example, host deployed multi-tier applications such as packaged applications, as well as one or more virtualization manager(s) (not shown) that reside and execute in a central server, or alternatively, run as VM(s) in hosts 142. A virtual data center is a logical construct that provides compute, network, and storage resources to an organization. In particular, virtual data centers provide environments where VMs 110 can be created, stored, and operated, enabling complete abstraction between the consumption of infrastructure service and underlying resources.

Illustratively, packaged virtual machine applications $106_{1-N}$ are deployed in a virtual data center in cloud computing environment 104. Each packaged application includes pre-configured virtual machines, which are typically interdependent VMs that communicate over network(s). As shown, packaged application $106_1$ includes VMs $110_{1-3}$ (but may generally include any number of VMs) and an isolated virtual network 108 that is internal to packaged application $106_1$ and used to communicate between VMs $110_{1-3}$. In some embodiments, isolated organization network(s) (not shown) may also be created allowing communications between the VMs within that packaged application(s) and/or a virtual data center. As described, isolated networks may be created, e.g., for security purposes or to avoid the costs associated with making packaged applications externally routable.

It should be understood that virtual networks may be logically isolated from other networks using, e.g., virtual local area networks (VLANs). Isolated virtual networks such as virtual network 108 and the isolated organization network(s) described above are also not routed through edge gateways (or otherwise), so VMs (e.g., VMs $110_{1-3}$) that are only connected to such isolated virtual networks have no external connectivity to other networks or anything else. As a result, information such as that relating to the states of packaged applications $106_{1-N}$ cannot be communicated externally via networking, making it difficult to automatically monitor VM services within and states of packaged applications $106_{1-N}$ and take actions based on such monitoring. For example, one of packaged applications $106_{1-N}$ may fail, but not be able to communicate its failed state externally (i.e., outside the isolated environment) so that the failed packaged application can be deleted and redeployed. As a result, resources (e.g., CPU, memory, power, cooling, etc.) may be wasted on the failed packaged application that should instead be deleted and redeployed.

One or more embodiments provide a mechanism for VMs, including those within packaged applications, that are only connected to isolated networks to communicate with entities external to the isolated networks. As a result, information such as VM services and state information can be exposed to an external decoder that may use such information to remediate issues with the VMs (or packaged application). As shown, a VM $110_1$, which may in one embodiment be a primary VM that is the main console of packaged application $106_1$, includes an encoder 112 configured to gather information relating to the state of packaged application $106_1$, as well as an identifier (ID) and creation year of packaged application $106_1$. In turn, encoder 112 encodes the gathered information, or information derived therefrom, in an IP address that encoder 112 then configures as the static IP address of unconnected VNIC (virtual network interface card) 114. In a particular embodiment, encoder 112 may include a PowerShell script that is executed to perform the information gathering, encoding, and configuring of the unconnected VNIC's 114 static IP address. Although VNIC 114 is discussed herein as an example of an unconnected VNIC which may be assigned a static IP address with information encoded therein, it should be understood that the static IP address of any unconnected VNIC, including an unconnected VNIC of leader VM $110_1$ or of another VM 110, may be utilized to encode information. In general, the particular unconnected VNIC(s) used by an encoder to communicate information with a decoder outside an isolated environment may be agreed upon by design (i.e., the encoder encodes information in an IP address assigned to a pre-defined VNIC that the decoder is aware of and retrieves the IP address from).

As shown, a decoder 192 running in a computer server 180 is responsible for decoding information that is encoded in the static IP address assigned to unconnected VNIC 114 and taking appropriate actions in response to the decoded information, as discussed in greater detail below. For example, if the IP address assigned to VNIC 114 encodes a failure state of packaged application $106_1$, then upon decoding such a failure state, decoder 192 may generate an alert (e.g., an e-mail) indicating the failure as well as take remediation actions such as deleting packaged application $106_1$ and reprovisioning an equivalent packaged application. Server 180 is included to be representative of a physical computing system as well as a virtual computing instance (e.g., a VM) hosted on an underlying physical computing system. Although shown as a single computing system, one of ordinary skill in the art will recognized that the components of server 180 shown may be distributed across multiple computing systems connected by a network.

Server 180 includes processor(s), shown as CPU(s) 182, a network interface (shown as a NIC) 184 connecting computer server 180 to network 170, a memory 190, and storage 194, which are similar to CPUs 143, system memory 143, network interface 145, and storage system 146, respectively, of host 142 that are discussed above, and will not be described in detail herein for conciseness. Server 180 may also include an I/O device interface 186 connecting I/O devices (e.g., keyboard, display and mouse devices) to computer server 180, as well as an interconnect 188 that facilitates transmission, such as of programming instructions and application data, between CPU(s) 182, I/O device interface 186, storage 194, network interface 184, and memory 190.

As shown, memory 190 includes an operating system 191 and decoder 192. The operating system 191 may be, e.g., Windows® or Linux®. Decoder 192 is responsible for retrieving the static IP address assigned to unconnected VNIC 114 (as well as potentially other unconnected VNICs) which includes packaged application $106_1$ state information encoded therein, decoding the encoded information, and, if necessary, taking remediation actions based on the decoded information, as discussed in greater detail below. For example, decoder 192 may be a Java application that crawls cloud computing environments 104 (and multiple cloud data centers, if appropriate) to retrieve information on packaged applications that meet certain criteria, and then further retrieves information on VMs in those packaged applications, information on particular VMs whose unconnected VNICs are assigned IP addresses with information encoded therein, information on VNICs of those VMs, and static IP addresses assigned to particular unconnected VNICs that encode packaged application state information, and then decoder 192 may take appropriate actions based on decoding of such static IP addresses.

In order to retrieve the static IP address assigned to unconnected VNIC 114 (and to any other unconnected VNIC whose IP address encodes information), decoder 192 invokes one of the API(s) 152 provided by cloud director 150. In one embodiment, the API 152 being invoked may be an API that is publicly available, also referred to as a public API or open API. It should be understood that, by using such a public API, decoder 192 does not require special privileges to retrieve the static IP address, and packaged application $106_1$ does not need to be disrupted. However, public cloud APIs typically only expose limited functionalities for security purposes. In a particular embodiment in which cloud director 150 is vCloud Director® produced by VMware, Inc., decoder 192 may invoke the vCloud Director® API to retrieve static IP addresses assigned to unconnected VNICs (as well as other information such as the packaged applications that meet certain criteria, etc. described above). In such a case, vCloud Director® may interact with VMware Tools, which is a suite of utilities that is installed in the guest OS inside a VM and enhances performance of the guest OS and improves VM management, to retrieve the static IP address assigned to an unconnected VNIC as configured in the guest OS. In addition, decoder 192 may also invoke a public API such as one of the API(s) 152, which may (or may not) be a different API than that invoked to retrieve the static IP address assigned to the unconnected VNIC, to perform remediation actions such as deleting and reprovisioning a packaged application that has failed. Continuing the example above of cloud director 150 being vCloud Director®, decoder 192 may call the VMware Learning Platform™ API to delete and restart the failed packaged application. Although described herein primarily with respect to API(s) 152 exposed by cloud director 150, it should be understood that in alternative embodiments, static IP addresses of unconnected VNICs may be retrieved and actions performed in response in any feasible manner. For example, outside of the cloud context, a decoder may invoke public APIs provided by virtualization software, such as vSphere® APIs, to retrieve the static IP addresses and perform remediation actions in one embodiment.

Figure 2:
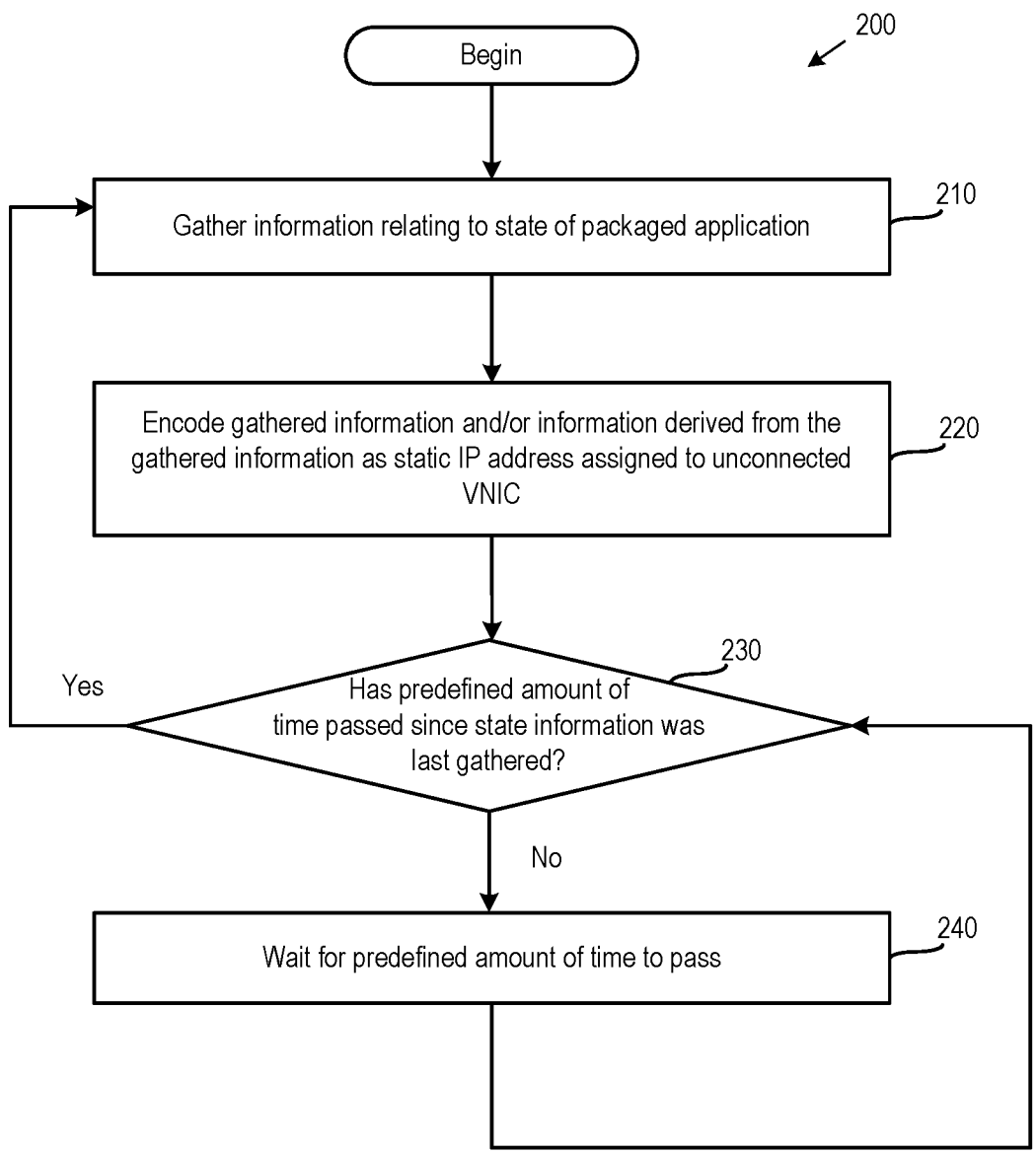
FIG. 2 illustrates a method for encoding a packaged virtual machine application's state information in an Internet Protocol (IP) address of an unconnected network interface, according to an embodiment.

FIG. 2 illustrates a method 200 for encoding a packaged virtual machine application's state information in an IP address assigned to an unconnected network interface, according to an embodiment. As shown, method 200 begins at step 210, where encoder 112 gathers information relating to the state of packaged application $106_1$. It should be understood the state information that is gathered may generally depend on the type of packaged application $106_1$ and what information is useful for determining whether that type of packaged application is healthy and usable. In one embodiment, encoder 112 may make necessary calls to gather state information on services running within packaged application $106_1$, VMs, data stores, internal communication, and/or other critical elements of packaged application $106_1$. For example, encoder 112 may query file systems and servers, ping other VMs to determine whether those VMs are up and running, determine that certain IP addresses are in use, check for responses on specific TCP (Transmission Control Protocol) ports (e.g., check if a web server is responding on a specific host by "touching" port 80 on the host's IP address, which does not require asking the web server to send a web page and can be useful for determining if the machine is listening, particularly for applications that are not typically interactive), check that packaged application's $106_1$ services are online, ensure that a website provided by packaged application $106_1$ is responding to certain text or code(s), and the like. In addition, encoder 112 may gather general information on packaged application $106_1$, such as an identifier (ID) of the packaged application and a creation year of the packaged application. In one embodiment, encoder 112 may be a script that is programmed (e.g., by a user who implemented packaged application $106_1$) to gather the requisite information.

At step 220, encoder 112 encodes the gathered information and/or information derived from the gathered information as a static IP address that is assigned to unconnected VNIC 114. That is, encoder 112 writes information, in an encoded form, to the static IP address that is assigned to unconnected VNIC 114. Then, another application, namely decoder 192, reads such information by retrieving and decoding the static IP address of unconnected VNIC 114. By doing so, information, such as the packaged application's $106_1$ state, ID, and creation year, may be passed outside to decoder 192, even when packaged application $106_1$ does not have external network connectivity. Although the packaged application's $106_1$ state, ID, and creation year are described herein as an example of information that may be encoded in a static IP address of unconnected VNIC 114, it should be understood that, in general, anything capable of detection inside a packaged application may be encoded as part of an unconnected VNIC's static IP address so long as encoder 112 and decoder 192 are configured with mappings between status codes used to encode the information and the meanings of such codes. For example, encoder 112 may check whether the packaged application is using an expired SSL (Secure Sockets Layer) certificate and, if the SSL certificate has expired, encode such information in the static IP address of unconnected VNIC 114, or alternatively encode a "failed" status of the packaged application in the static IP address of unconnected VNIC 114, as the expired SSL certificate will cause the packaged application to fail.

In a particular embodiment, the second byte in the static IP address assigned to unconnected VNIC 114 may be used to encode the creation year of packaged application $106_1$, the third byte in the IP address assigned to unconnected VNIC 114 may be used to encode an ID of packaged application 106₁, and the last byte in the IP address assigned to unconnected VNIC 114 may be used to encode state information of packaged application 106₁. The ID and creation year of packaged applications may be used to filter the monitoring and remediation process, as only some packaged applications (having specific IDs and creation years) may need to be monitored and remediated. Further, the last byte of the static IP address encoding state information of packaged application 106₁ may have the following predefined values and associated states: 1-5 for "provisioning," 101-104 for "failed," 105 for "labcheck," 200 for "ready," 201 for "autolab," 202 for "provisioning," 203 for "timeout," 204 for "firewall," and 205 for "alert." Each of the 1-5 codes for "provisioning" and 101-104 codes for "failed" may be used at different times so that time information can also be captured in the encoded IP address. For example, when state information is gathered after initial provisioning of packaged application 106₁, encoder 112 may encode a failed state of packaged application 106₁ as 101. When state information is gathered again at a later time (e.g., one hour later), encoder 112 may encode a failed state of packaged application 106₁ at the later time as 102, etc.

In another embodiment, encoder 112 may itself remediate some issues indicated by the gathered state information. For example, when encoder 112 determines from the gathered state information that a SQL (Structured Query Language) server has stopped, causing a web application relying on the SQL server to stop functioning properly, encoder 112 may start the web server again and then restart the web application. It should be understood that other types remediation actions may also be taken by encoder 112 (or another application based on state information that is gathered). However, there may be some issues that encoder 112 cannot itself remediate. For example, encoder 112 may be unable to remediate an expired SSL certificate, which may cause a packaged application to fail. However, by writing information including state information of packaged application 106₁ to the static IP address assigned to unconnected VNIC 114 at step 220, encoder 112 can pass such information outside of packaged application 106₁ so that, e.g., a user may be alerted to remedy the issue or the packaged application 106₁ may be deleted and reprovisioned.

At step 230, encoder 112 determines whether a predefined amount of time has passed since state information was last gathered on packaged application 106₁. In one embodiment, encoder 112 gathers state information when packaged application 106₁ is first deployed and also periodically thereafter (e.g., every hour), permitting state changes over time to be observed and acted upon.

If encoder 112 determines that the predefined amount of time has not yet passed, then at step 240, encoder 112 waits for the predefined amount of time to pass. On the other hand, if the predefined amount of time has passed, then method 200 returns to step 210, where encoder 112 gathers additional information relating to the state of packaged application 106₁.

Figure 3:
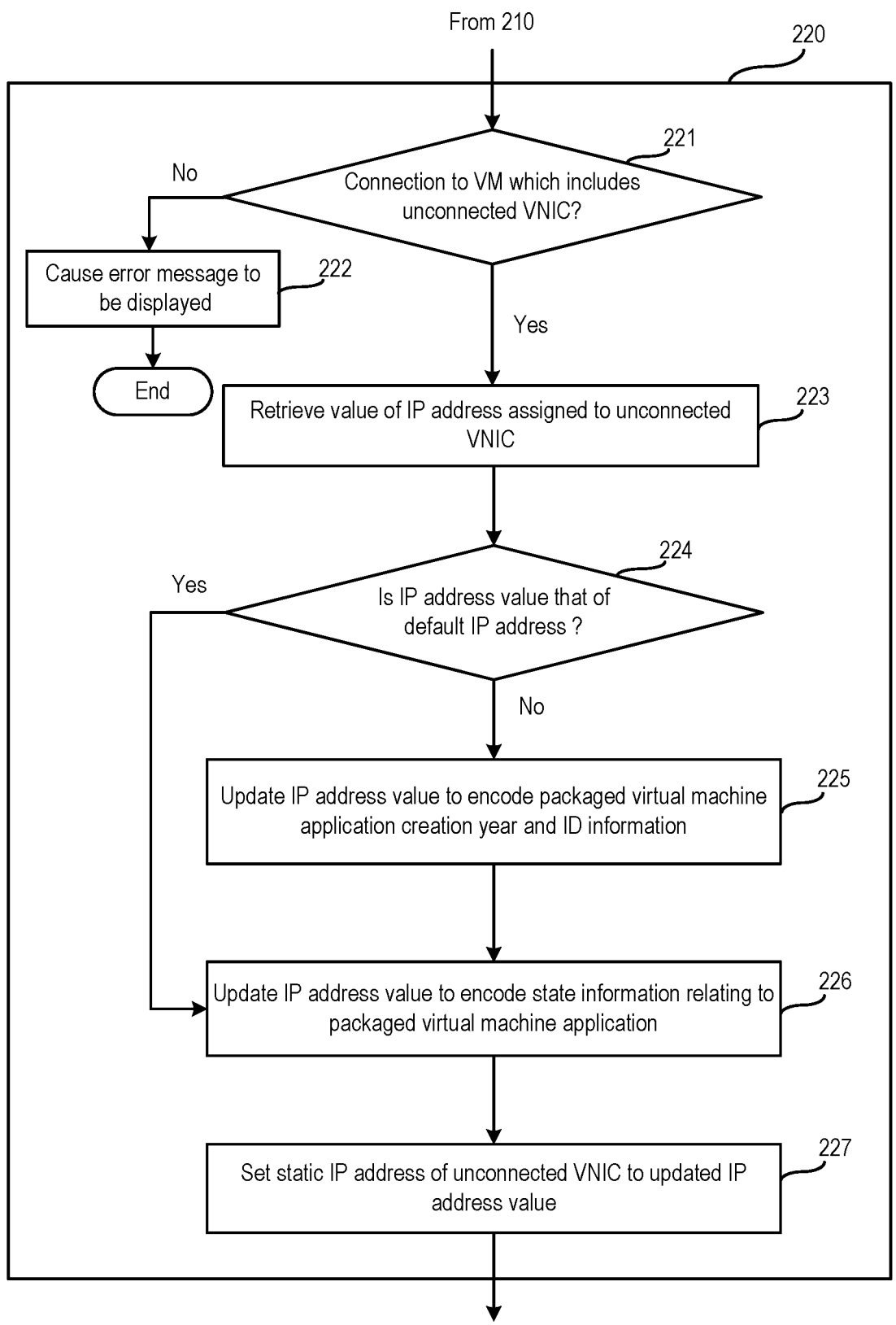
FIG. 3 illustrates in greater detail an encoding step of the method shown in FIG. 2, according to an embodiment.

FIG. 3 illustrates in greater detail the encoding step 220 of method 200, according to an embodiment. As shown, at step 221, encoder 112 checks whether there is a connection to VM 1102 which includes the unconnected VNIC 114. This is assuming the unconnected VNIC is not a VNIC of the same VM in which encoder 112 is running, in which case step 221 need not be performed. If no connection to VM 1102 is detected, then encoder 112 causes an error message to be output at step 222.

If, on the other hand, there is a connection to VM 1102, then at step 223, encoder 112 retrieves a value of the IP address assigned to unconnected VNIC 114, and encoder 112 determines whether the IP address value is that of a default IP address at step 224. For example, if VM 1102 is running the Linux® OS and VM 110₁ is running the Windows® OS, then encoder 112 may use a Windows Secure Shell (SSH) client to obtain the IP address value of unconnected VNIC 114, and the default IP address of 192.168.250 may indicate that the IP address does not encode any information. In such a case, the default IP address may be used to report a failure or misconfiguration that results in a communication breakdown between the Windows VM that performs encoding and the Linux VM that the encoder queries. When such a failure or misconfiguration occurs, the default IP address on the 192.168.250.0 network would be seen by the encoder, indicating the failure.

If the IP address value of unconnected VNIC 114 is not the default IP address, then at step 225, encoder 112 updates the IP address value to encode the packaged application's 106₁ creation year and ID information in the IP address. Continuing the example above, if the IP address value of unconnected VNIC 114 is not the default address 192.168.250.0, then the second and third bytes of the IP address value may be updated to be the creation year $YEAR and ID $SKU of packaged application 106₁, respectively: 192.$YEAR.$SKU. It should be understood that steps 224-225 are performed to ensure that the static IP address of unconnected VNIC 114 is an expected default address or within a specific IP range, as, although unlikely, a user could possibly change the IP address of unconnected VNIC 114 to something else, producing unpredictable results.

At step 226, encoder 112 further updates the IP address value to encode state information relating to packaged application 106₁. In one embodiment, the state information encoded in the IP address may be the state information that is gathered by encoder 112 or information derived from the gathered information. Continuing the example above in which codes of 1-5 are used for encoding a "provisioning" state, 101-104 for a "failed" state, 105 for a "labcheck" state, 200 for a "ready" state, 201 for an "autolab" state, 202 for another "provisioning" state, 203 for a "timeout" state, 204 for a "firewall" state, and 205 for an "alert" state, encoder 112 may determine which state packaged application 106₁ is in based on the gathered state information and append a code indicating the determined state to the IP address value (as the last byte of the IP address). For example, the expiration of an SSL certificate used by a web server service in packaged application 106₁ may constitute a critical error that is encoded as a "failed" state in the IP address. In other embodiments, raw state information that is gathered, such as information indicating the expiration of the SSL certificate, may be encoded in lieu of, or in addition, to such derived state information.

At step 227, encoder 112 sets the static IP address of unconnected VNIC 114 to the updated IP address value. Continuing the example from above in which VM 1102 is a Linux® box, encoder 112 may issue a command via the Windows SSH client to assign the updated IP address value as the static IP address in the Linux® OS for the unconnected VNIC 114. In such a case, encoder 112 may additionally confirm via SSH whether the command actually executed and generate an alert to the user if the command does not execute. In another embodiment, encoder 112 may also set the static IP address of unconnected VNIC 114 again to the updated IP address value whenever VM 1102 reboots.

In yet another embodiment, encoder 112 may determine whether a user has been assigned to manually check on packaged application 106$_1$. If such a user has been assigned, then encoder 112 may disable periodic gathering of packaged application 106$_1$ state information and writing of the same to the unconnected VNIC, which may be unnecessary as the user will manually check on packaged application 106$_1$.

Figure 4:
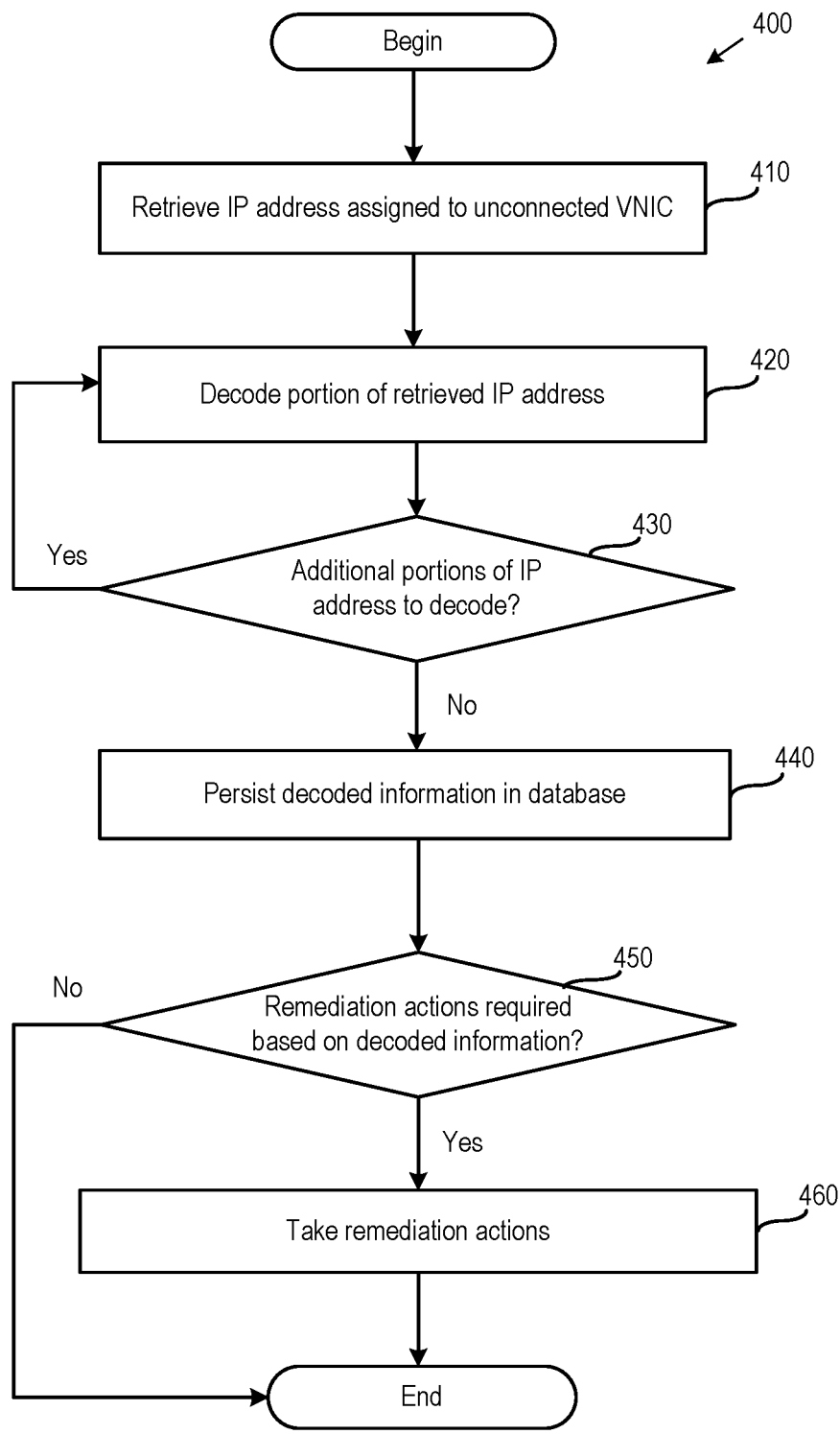
FIG. 4 illustrates a method for decoding an IP address assigned to an unconnected virtual network interface card, according to an embodiment.

FIG. 4 illustrates a method 400 for decoding an IP address assigned to an unconnected virtual network interface card, according to an embodiment. As shown, method 400 begins at step 410, where decoder 192 retrieves an IP address assigned to unconnected VNIC 114. In one embodiment, decoder 192 may invoke public API 120 provided by cloud director 150 in retrieving the IP address assigned to unconnected VNIC 114, as well as other unconnected VNICs (however, only VNIC 114 is discussed with respect to FIG. 4 for conciseness). For example, decoder 192 may crawl cloud computing environments 104 (and multiple cloud data centers if appropriate), make API calls to retrieve information on packaged applications that meet criteria associated with those packaged applications (including packaged application 106$_1$) whose states are being monitored, retrieve information on the VMs in those packaged applications that is used to identify VMs such as VM 110$_2$ with unconnected VNICs, retrieve information on the identified VMs such as VM 110$_2$, retrieve information on VNICs of the identified VMs that is used to identify unconnected VNIC(s) such as unconnected VNIC 114 whose IP address(es) are being used to encode packaged application state information, and then retrieve the IP address(es) of the unconnected VNIC(s) including unconnected VNIC 114.

At step 420, decoder 192 decodes a portion of the retrieved IP address of unconnected VNIC 114. In one embodiment, the portion of the IP address may be one of the bytes in the IP address. Returning to the example above in which the last byte (101) in IP address 192.018.1.101 was used to encode the state of packaged application 106$_1$, decoder 192 may decode the last byte to determine the meaning of 101. As described, the last byte of the IP address may have the following predefined values and associated statuses in a particular embodiment: 1-5 for "provisioning," 101-104 for "failed," 105 for "labcheck," 200 for "ready," 201 for "autolab," 202 for "provisioning," 203 for "timeout," 204 for "firewall," 205 for "alert," and otherwise "unknown." Decoder 192 is configured to check each of these possibilities to decode the portion of the IP address based on a match to one of the predefined values (or as "unknown" if the portion of the IP address does not match any of the predefined values). In some embodiments, information such as packaged application ID and creation year may also be encoded in the IP address assigned to unconnected VNIC 114. In such a case, decoder 192 may be configured to decode portions of the IP address where such information is encoded to determine the name, creation year, etc. information.

At step 430, if there are additional portions of the IP address assigned to unconnected VNIC 114 that have yet not been decoded (and that need to be decoded), then method 400 returns to step 420, where decoder 192 decodes another portion of the retrieved IP address assigned to unconnected VNIC 114.

On the other hand, if there are no remaining portions of the IP address assigned to unconnected VNIC 114 that need to be decoded, then method 400 continues to step 440, where decoder 192 persists the decoded information in a database. Such information that is persisted in the database may later be, e.g., viewed by a user through a dashboard or utilized for historical analysis purposes. In addition to persisting the decoded information itself in the database, in one embodiment decoder 192 may also persist other information that decoder 192 itself determines (rather than decodes from the retrieved IP address) in the database, such as names of a cloud and organizational data center in which packaged application 106$_1$ runs, a date and time stamp, and the like.

At step 450, decoder 192 determines whether remediation actions are required based on the decoded information. If the information decoded at steps 420-430 indicates that packaged application 106$_1$ is in a healthy state, then no remediation actions are required and method 400 ends. Continuing the example from above, if decoder 192 determines that the last byte of unconnected VNIC 114's IP address is 200, indicating that packaged application 106$_1$ is in the "ready" state, then decoder 192 may take no remediation action. It should be understood that method 400 may be performed again at later time(s), such as periodically, in order to determine whether packaged application's 106$_1$ state has changed and remediation actions need to be taken at the later time(s).

If, on the other hand, decoder 192 determines at step 450 that remediation actions are required, then at step 460, decoder 192 takes the remediation actions. In one embodiment, the remediation actions may include deleting the packaged application, reprovisioning an equivalent packaged application, and alerting a user (e.g., via e-mail). Continuing the example from above, if decoder 192 determines that the status in the last byte of unconnected VNIC 114's IP address is 101, 102, 103, or 104, indicating packaged application 106$_1$ is in a "failed" state at a certain point in time, then decoder 192 may invoke API(s) 152 provided by cloud director 150 to delete packaged application 106$_1$ and provision an equivalent packaged application, as well as send an e-mail alert to one or more administrators notifying them of the packaged application 106$_1$ state information and remediation action. Similar to the discussion above, the e-mail alert may also include information that decoder 192 itself determines (rather than decodes) such as the names of a cloud and organizational data center in which packaged application 106$_1$ runs, a date and time stamp, and the like. In a particular embodiment in which cloud director 150 is a vCloud Director®, decoder 192 may invoke the VMware® Learning Platform API to perform remediation actions such as deleting packaged application 106$_1$ and reprovisioning an equivalent packaged application.

Advantageously, techniques disclosed herein permit virtual computing instances, including the VMs in packaged applications, to communicate with external entities without requiring networking. In particular, state information of virtual computing instances that lack external network connectivity may be encoded in static IP addresses assigned to unconnected VNICs, and the static IP addresses may then be decoded by a decoder that could not otherwise communicate with the virtual computing instance via any network. Further, the decoder may automatically take remediation actions based on decoded state information, such as sending an e-mail alert to a user or deleting and reprovisioning a packaged application.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method for communicating with a virtual computing instance in an isolated environment from outside the isolated environment, the computer-implemented method comprising:
    retrieving a network address value of an unconnected network interface, wherein:
        the network address value includes information encoded by the virtual computing instance in the isolated environment; and
        the unconnected network interface is a network interface of the virtual computing instance or of another virtual computing instance in the isolated environment; and
    decoding the encoded information in the retrieved network address value.

2. The computer-implemented method of claim 1, further comprising, performing one or more actions based, at least in part, on the decoded information.

3. The computer-implemented method of claim 2, wherein the one or more actions include at least one of:

alerting a user; or remediating an issue with one or more virtual computing instances m the isolated environment.

4. The computer-implemented method of claim 1, wherein retrieving the network address value of the unconnected network interface is by invoking a public application programming interface (API).

5. The computer-implemented method of claim 1, wherein the unconnected network interface is not connected to any network, including the isolated environment.

6. The computer-implemented method of claim 1, wherein the virtual computing instance is one of a plurality of virtual machines (VMs) in a packaged virtual machine application.

7. The computer-implemented method of claim 6, wherein the information encoded in the network address value includes information relating to a state of the packaged virtual machine application.

8. The computer-implemented method of claim 6, wherein the information encoded in the network address value further includes at least one of:

an identifier (ID) of the packaged virtual machine application; or a creation year of the packaged virtual machine application.

9. A non-transitory computer-readable storage medium storing instructions, which when executed by a computer system, cause the computer system to perform operations for communicating with a virtual computing instance in an isolated environment from outside the isolated environment, the operations comprising:

retrieving a network address value of an unconnected network interface, wherein:

the network address value includes information encoded by the virtual computing instance in the isolated environment; and the unconnected network interface is a network interface of the virtual computing instance or of another virtual computing instance in the isolated environment; and decoding the encoded information in the retrieved network address value.

10. The non-transitory computer-readable storage medium of claim 9, the operations further comprising performing one or more actions based, at least in part, on the decoded information.

11. The non-transitory computer-readable storage medium of claim 10, wherein the one or more actions include at least one of:

alerting a user; or remediating an issue with one or more virtual computing instances m the isolated environment.

12. The non-transitory computer-readable storage medium of claim 9, wherein retrieving the network address value of the unconnected network interface is by invoking a public application programming interface (API).

13. The non-transitory computer-readable storage medium of claim 9, wherein the unconnected network interface is not connected to any network, including the isolated environment.

14. The non-transitory computer-readable storage medium of claim 9, wherein the virtual computing instance is one of a plurality of virtual machines (VMs) in a packaged virtual machine application.

15. The non-transitory computer-readable storage medium of claim 14, wherein the information encoded in the network address value includes information relating to a state of the packaged virtual machine application.

16. The non-transitory computer-readable storage medium of claim 14, wherein the information encoded in the network address value further includes at least one of:

an identifier (ID) of the packaged virtual machine application; or a creation year of the packaged virtual machine application.

17. A computer system comprising:

one or more processors; and a non-transitory computer-readable storage medium storing instructions, which when executed by a the one or more processors, cause the computer system to perform operations for communicating with a virtual computing instance in an isolated environment from outside the isolated environment, the operations comprising:

retrieving a network address value of an unconnected network interface, wherein:

the network address value includes information encoded by the virtual computing instance in the isolated environment; and the unconnected network interface is a network interface of the virtual computing instance or of another virtual computing instance in the isolated environment; and decoding the encoded information in the retrieved network address value.

18. The system of claim 17, wherein the operations further comprise performing one or more actions based, at least in part, on the decoded information.

19. The system of claim 18, wherein the one or more actions include at least one of:

alerting a user; or remediating an issue with one or more virtual computing instances m the isolated environment.

20. The system of claim 17, wherein retrieving the network address value of the unconnected network interface is by invoking a public application programming interface (API).

* * * * *